(12) United States Patent
Tanizaki et al.

(10) Patent No.: US 6,268,833 B1
(45) Date of Patent: Jul. 31, 2001

(54) ANTENNA DEVICE AND TRANSMITTING/ RECEIVING APPARATUS

(75) Inventors: Toru Tanizaki, Nagaokakyo; Taiyo Nishiyama, Otsu; Nobuhiro Kondou, Hirakata, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/346,812

(22) Filed: Jul. 2, 1999

(30) Foreign Application Priority Data

Jul. 6, 1998 (JP) .................................................. 10-190669

(51) Int. Cl.[7] .................................................. H01Q 3/00
(52) U.S. Cl. ............................................................ 343/766
(58) Field of Search ..................................... 343/766, 713, 343/754, 757, 709, 751, 785, 854, 710, 765, 753, 755, 761, 909

(56) References Cited

U.S. PATENT DOCUMENTS

| | | | |
|---|---|---|---|
| 4,257,048 | * 3/1981 | Yokoi et al. ........................... | 343/709 |
| 4,796,032 | * 1/1989 | Sakurai et al. ........................ | 342/359 |
| 4,873,526 | * 10/1989 | Katsuo ................................. | 342/359 |
| 4,887,091 | * 12/1989 | Yamada ................................ | 343/714 |
| 5,751,247 | * 5/1998 | Nomoto et al. ....................... | 342/359 |
| 5,835,057 | * 11/1998 | Van Heyningen .................... | 342/359 |
| 5,933,109 | * 8/1999 | Tohya et al. .......................... | 342/175 |
| 6,034,642 | * 3/2000 | Kojima et al. ........................ | 343/753 |

* cited by examiner

*Primary Examiner*—Don Wong
*Assistant Examiner*—Chuc Tran
(74) *Attorney, Agent, or Firm*—Ostrolenk, Faber, Gerb & Soffen, L

(57) ABSTRACT

An improved antenna device is provided which is easy to be made compact in size and easy to deflect a beam at a high speed. Further, a transmitting/receiving apparatus using the improved antenna device is provided which is capable of performing a detection within a large range. In particular, a primary radiator and a first transmission line combined with the primary radiator are provided on a movable section, a second transmission line electromagnetically combined with the first transmission line and a dielectric lens with a position of said primary radiator serving as a generally focal point surface are provided on a fixed section. Further, a structure is provided capable of deflecting the beam by displacing the movable section. Also, means is provided to detect the position of the movable section and a control means is provided for displacing the movable section in accordance with a position designating signal of the movable section.

6 Claims, 17 Drawing Sheets

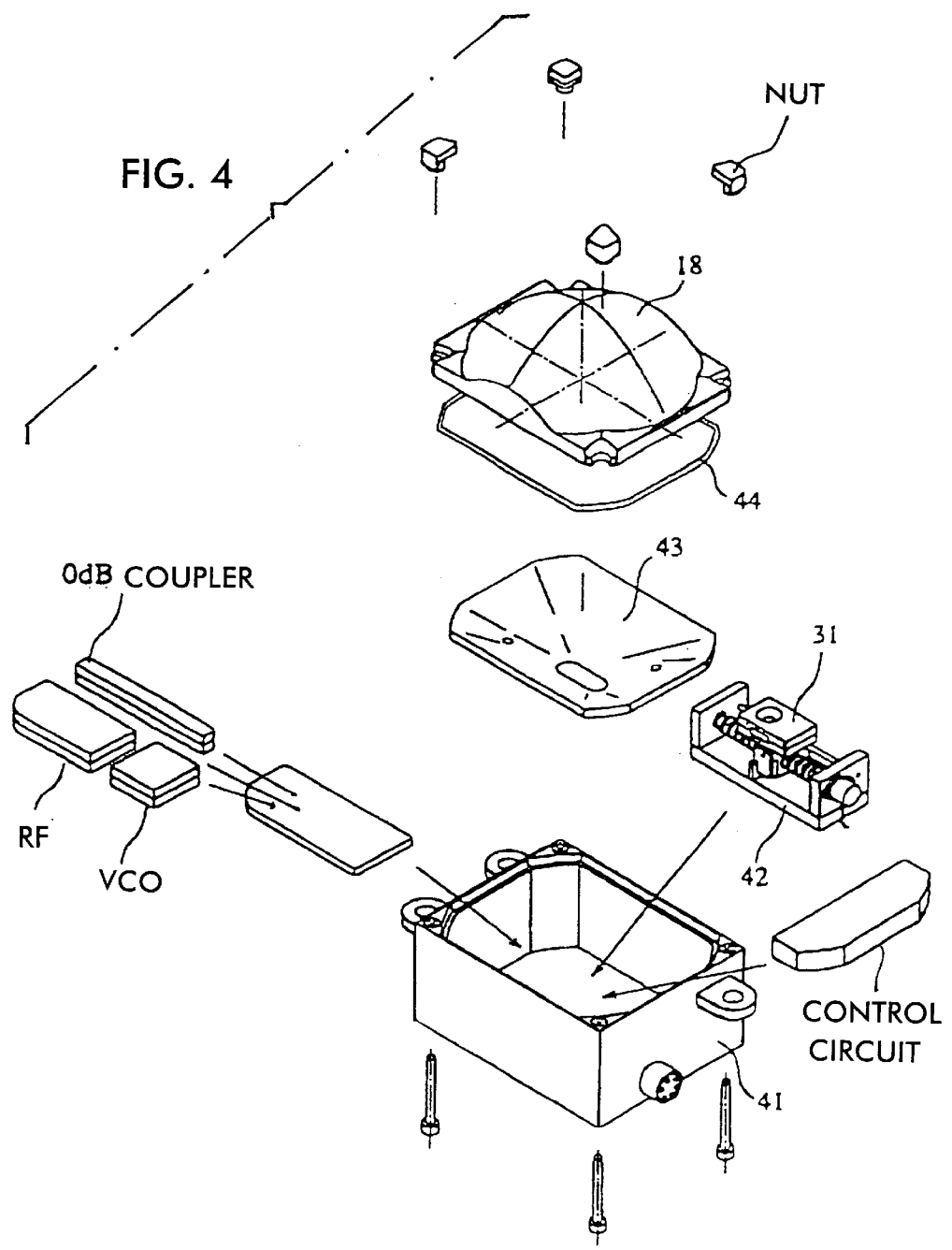

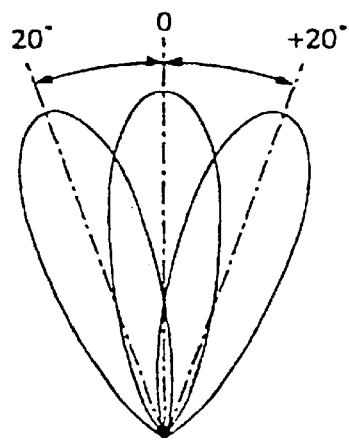
FIG. 14A
FIG. 14B
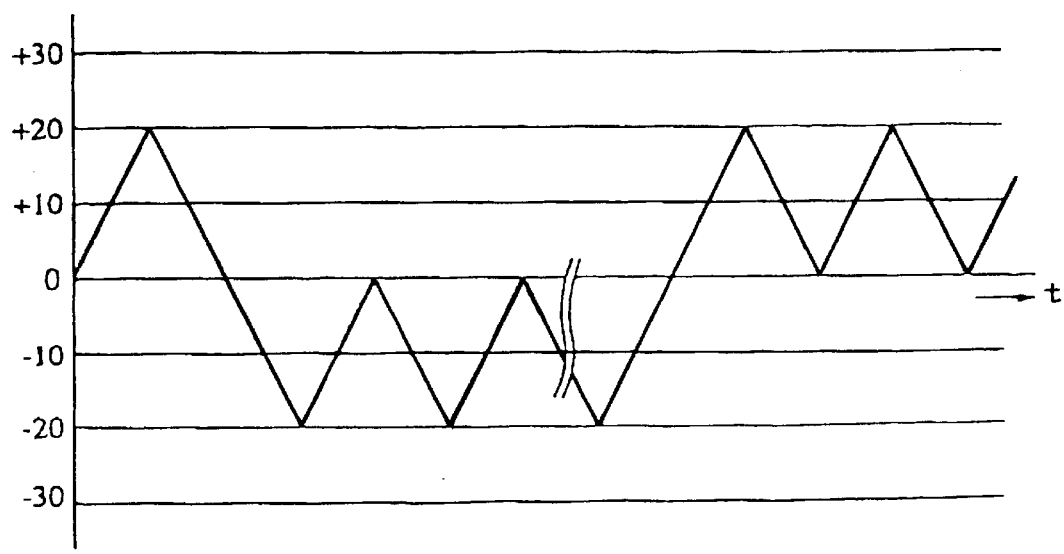

ANTENNA DEVICE AND TRANSMITTING/RECEIVING APPARATUS

BACKGROUND OF THE INVENTION

1. Field of the Invention

The present invention relates to an antenna device for use in a frequency band of a millimeter wave, also relates to a transmitting/receiving apparatus using the antenna device.

2. Description of the Related Art

There has been known an on-vehicle millimeter wave radar for use in a vehicle travelling on a road to measure a distance between this vehicle and another vehicle traveling ahead or behind, so as to measure a relative speed of this vehicle with respect to said another vehicle. Such millimeter wave radar, i.e., a transmitting/receiving apparatus consists of an integrally fabricated module including a millimeter wave oscillator, a circulator, a directional coupler, a mixer and an antenna device, with said transmitting/receiving apparatus being attached on the front or the rear portion of the vehicle.

The antenna device for use in the above millimeter wave radar consists of a primary radiator and a dielectric lens. A transmitting/receiving wave beam is formed by disposing the primary radiator in a focal point position of the dielectric lens.

However, the above conventional millimeter wave radar has at least the following problem which will be discussed in detail in the following. Namely, since the antenna device of the conventional millimeter wave radar has a fixed directivity, some predetermined detections and measurements will fail to be performed in a desired manner because of the restrictions of certain conditions. For instance, when a vehicle is running on a road having a plurality of traffic lanes, if the antenna device merely receives an electromagnetic wave reflected from another vehicle running ahead, it is still not possible to immediately determine whether or not the another vehicle is running along the same traffic lane on which this vehicle is running. Further, if a vehicle is running along a curved section or a waved section on a road, and if another vehicle running ahead of this vehicle along the same traffic lane is deviating from a detectable area, it is impossible to effect a desired detection.

Thus, in order to cope with the above problem, it is allowed to consider rotating an entire frame structure mounting the transmitting/receiving apparatus including the antenna device, so as to deflect the beam of an electromagnetic wave.

However, in use of such a rotatable structure, since an entire frame structure mounting the transmitting/receiving apparatus is required to be rotated, the apparatus as a whole will have to become large. Further, since movable parts of the apparatus have relatively large mass, it will be difficult to enable the beam of electromagnetic wave to scan at a high speed.

SUMMARY OF THE INVENTION

It is an object of the present invention to solve the above discussed problem associated with the above mentioned prior art, by providing an improved antenna device which is easy to be made compact in size and thus suitable for use in a high speed scanning of a beam of an electromagnetic wave. Another object of the present invention is to provide a transmitting/receiving apparatus using the improved antenna device.

According to the present invention, there is provided an antenna device characterized in that a primary radiator and a first transmission line combined with the primary radiator are provided on a movable section, a second transmission line electromagnetically combined with the first transmission line and a dielectric lens with a position of the primary radiator serving as a generally focal point surface are provided on a fixed section, the antenna device further comprising a driving mechanism capable of causing the movable section to be displaced relatively with respect to the fixed section, and control device capable of driving the driving mechanism and rendering the movable section to be displaced in accordance a position designating signal of the movable section. Further, movable section position detecting device for detecting the position of the movable section is provided, the control device is capable of driving the driving mechanism in accordance with a detection result of the movable section position detecting device and the position designating signal of the movable section. With the use of the above constitution, since at least the primary radiator and a first transmission line are provided on the movable section, it is possible to render the movable section compact in size, thereby rendering compact the entire size of the apparatus. Further, by making light the movable section of the apparatus, it is possible to enable the beam to scan at a high speed. In addition, since the above control device is capable of driving the driving mechanism of the movable section, the beam may be deflected in any optional direction by only supplying from outside a position designating signal of the movable section.

Further, according to the present invention, an antenna device as recited in the above is employed, a predetermined position designating signal is supplied to the control device so as to enable a beam, which is decided by a relative relationship between the dielectric lens and the primary radiator, to scan in a predetermined pattern, and to perform predetermined transmission and reception of an electromagnetic wave.

Moreover, according to the present invention, device is provided to store a position of the movable section as a standard position when the axis of the beam of the antenna device is directed in a predetermined direction, the control device is capable of determining the position of the movable section with the standard position serving as a reference.

In addition, according to the present invention, under a condition where the antenna device has been mounted on a mounting equipment such as a vehicle, device is provided for storing the position of the movable section as a standard position when the beam axis is directed in a predetermined direction while being viewed from the mounting equipment, the control device is capable of determining the position of the movable section with the standard position serving as a reference. With the use of the above structure, even if a relative relationship between the primary radiator and the dielectric lens is not uniform due to a possible error in an installing portion of a mounting equipment such as a vehicle or due to an error in an assembling operation, the axis of the beam is allowed to be directed in a predetermined direction without being affected by a fluctuation in the relative relationship.

BRIEF DESCRIPTION OF THE DRAWINGS

FIG. 4 is an exploded perspective view schematically indicating the constitutions of the antenna device and transmitting/receiving apparatus.

FIG. 14 indicates an example of a scanning pattern within a detecting range.

DESCRIPTION OF THE PREFERRED EMBODIMENTS

An antenna device and a transmitting/receiving apparatus made according to a first embodiment of the present invention will be described in the following with reference to FIGS. 1–11.

Figure 1A:
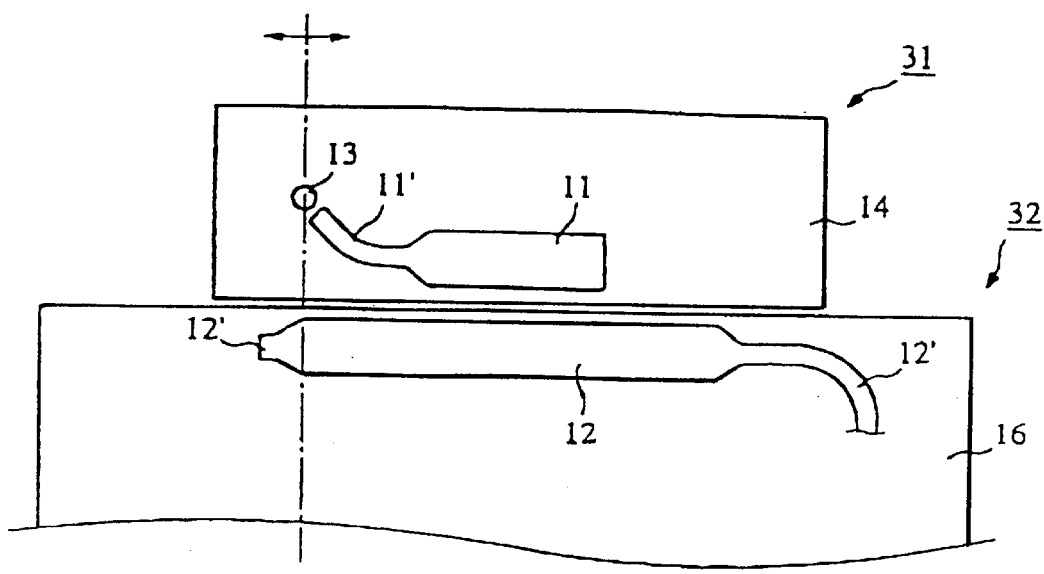
FIG. 1 schematically illustrates the constitution of an antenna device made according to a first embodiment of the present invention.
Figure 1B:
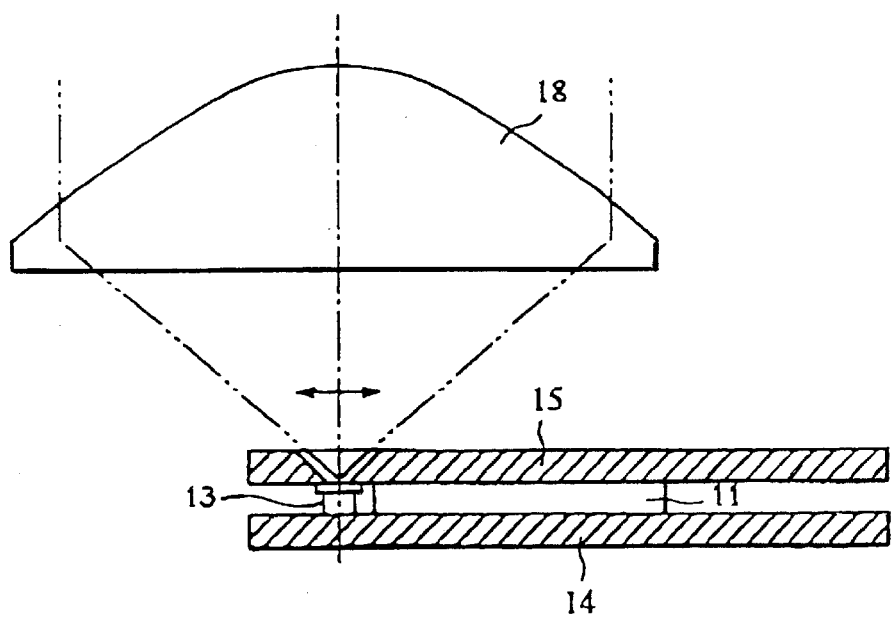

FIG. 1 is used to schematically indicate the structure of an antenna device made according to the first embodiment. FIG. 1A is a top plane view schematically indicating the antenna device but not showing related upper conductive plates. FIG. 1B is a sectional view schematically indicating a section passing through a primary radiator of the antenna device. In FIG. 1A, reference numeral 32 is used to represent a fixed section and reference numeral 31 is used to represent a movable section. The movable section 31 is provided in a manner such that its position is changeable relative to the fixed section 32 in a direction shown by the arrows in FIG. 1A. In detail, the movable section 31 includes a lower conductive plate 14 and a dielectric strip 11. Between the lower conductive plate 14 and an upper conductive plate (not shown in FIG. 1A), there is provided the dielectric strip 11 so as to form a first non-radiative dielectric guide (hereinafter referred to as NRD guide). The fixed section 32 includes a lower conductive plate 16 and a dielectric strip 12. Between the lower conductive plate 16 and the upper conductive plate (not shown in FIG. 1A), there is provided a dielectric strip 12 so as to form a second non-radiative dielectric guide.

The upper and lower conductive plates of the two NRD guides are arranged such that the edge faces of the two upper conductive plates are facing each other, so are the the edge faces of the two lower conductive plates. The two dielectric strips 11 and 12 serving as the two NRD guides are disposed in the vicinity of the edges of the two conductive plates 14 and 16, in a manner such that said strips 11 and 12 are close to and substantially parallel with each other. With the use of such an arrangement, it is allowed to form a directional coupler consisting of the two NRD guides.

In FIG. 1, reference numerals 11' and 12' are used to represent narrow portions of the two dielectric strips 11 and 12. By virtue of the narrow portions 11', 12' together with the upper and lower conductive plates located on both sides of the strips 11 and 12, it is allowed to respectively form NRD guides (hereinafter referred to as high burr NRD guide) each capable of transmitting a single mode which is SM01 mode.

On one end of the dielectric strip narrow portion 11' on the movable section 31, there is provided a primary radiator 13 consisting of a cylindrical dielectric resonator. As shown in FIG. 1B, the upper conductive plate 15 is formed with an opening which has a horn-like tapered portion coaxial with the primary radiator 13. Further, between the primary radiator 13 and said opening, there is inserted a slit plate obtained by forming a slit in an electrically conductive plate, in a manner as shown in FIG. 1B. With the use of such a structure, an electromagnetic wave is allowed to be transmitted through the interior of the dielectric strip narrow portion 11' along the longitudinal direction thereof, with an LSM mode having an electric field component in a direction parallel with the conductive plates 14 and 15 and having a magnetic field component in a direction perpendicular to the conductive plates 14 and 15. In fact, this electromagnetic wave is electromagnetically combined with a mode resonating by virtue of a dielectric resonator within the primary radiator 13, i.e., an HE111 mode having an electric field component arranged in the same direction as the electric field of the dielectric strip narrow portion 11'. As a result, an electromagnetic wave which is a linearly polarized wave is radiated through the above opening in a direction perpendicular to the conductive plate 14. A dielectric lens 18 is used to converge such electromagnetic wave so as to obtain a predetermined beam. On the other hand, if an electromagnetic wave is injected through the dielectric lens 18 and is admitted inwardly through the above opening, the primary radiator 13 will be excited with the HE111 mode, and said admitted electromagnetic wave is then transmitted with an LSM mode to the dielectric strip narrow portion 11' connected with the dielectric lens 18.

Figure 2A:
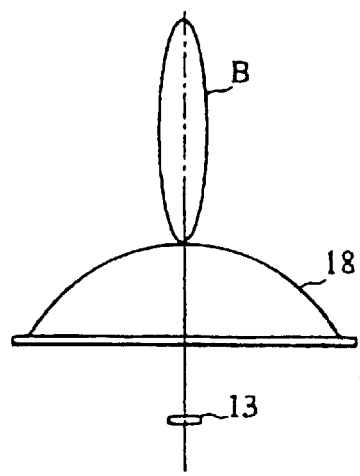
FIG. 2 illustrates a relationship among a dielectric lens, a relative position of a primary radiator, and an orientation of a beam.
Figure 2B:
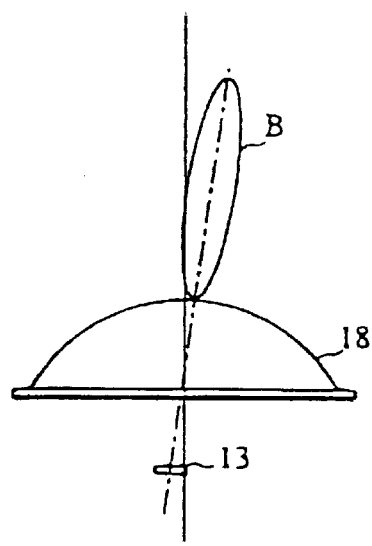
Figure 2C:
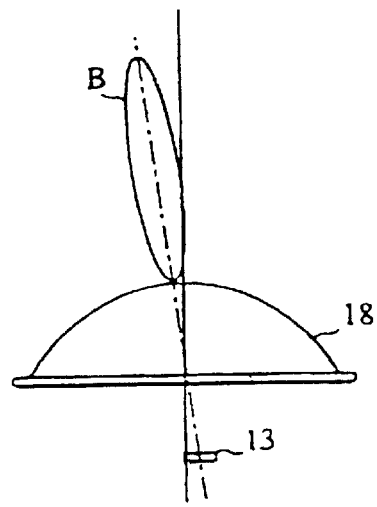

FIG. 2 is used to schematically indicate some changes in acting direction of an electromagnetic wave beam, which changes are usually caused due to a positional change of the above primary radiator. In this way, by arranging the primary radiator 13 at a position of a substantially focal point surface of the dielectric lens 18 and then causing the primary radiator 13 to move so as to have a change in its position (this kind of positional change can be effected by moving the movable section 31 shown in FIG. 1, with said movement being relative to the fixed portion 32), an electromagnetic wave for signal transmission and reception will be deflected leftwardly and rightwardly in a manner shown in FIG. 2.

Figure 3:
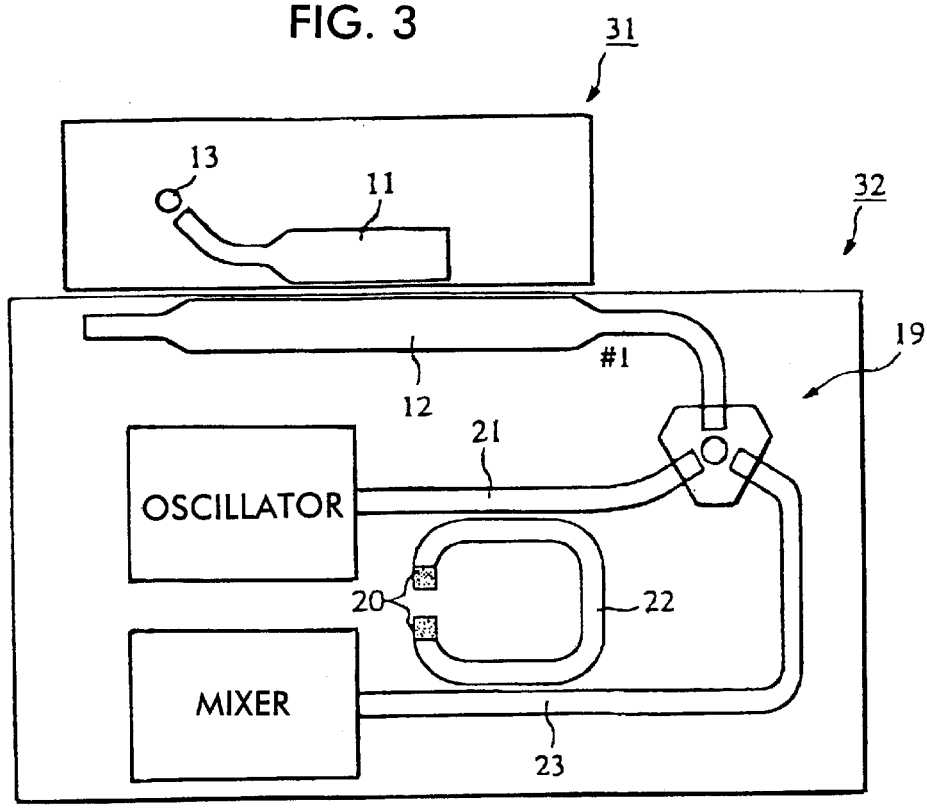
FIG. 3 is a view schematically indicating the constitution of a transmitting/receiving apparatus of the present invention.

FIG. 3 is a top plane view schematically indicating another antenna device but not showing related upper conductive plates. The structure of a directional coupler bridging a movable section 31 and a fixed section 32 is the same as that shown in FIG. 1. Here, a circulator 19 is connected with a port #1 serving as a signal input and output section of the directional coupler. To one port of the circulator 19 is connected a high burr NRD guide comprising a dielectric strip 21. To another port of the circulator 19 is connected a high burr NRD guide comprising a dielectric strip 23. Further, an oscillator is connected with the high burr NRD comprising a dielectric strip 21, whilst a mixer is connected with the high burr NRD comprising a dielectric strip 23. Between the dielectric strips 21 and 23 there is provided a further dielectric strip 22 which is combined with the high burr NRD guides relating to the corresponding dielectric strips. A terminator 20 is provided at either end of the dielectric strip 22. Here, the dielectric guides corresponding to the mixer and the oscillator, is provided with a varactor diode and a Gunn diode, while a substrate plate formed with a circuit for applying a bias voltage to the varactor diode and the Gunn diode is sandwiched between the middle layer sections of the dielectric strips, thereby forming a high burr guide having thus formed structure.

With the use of such a constitution, an oscillation signal from the oscillator is allowed to transmit by way of a rout consisting successively of the dielectric strip 21, the circulator 19, the dielectric strip 12, the dielectric strip 11 and the primary radiator 13, thereby enabling the electromagnetic wave to be radiated in the axial direction of the primary radiator 13. On the other hand, an electromagnetic wave admitted in the primary radiator 13 is transmitted in an adverse course consisting successively of the dielectric strip 11, the dielectric strip 12, the circulator 19, the dielectric strip 23 and the mixer, so as to be fed into the mixer. Further, part of the oscillation signal is caused to pass through two directional couplers consisting of the dielectric strips 21, 22 and 23, so as to be used as a local signal which is fed to the mixer together with a reception signal. In this way, the mixer is able to produce a differential frequency component acting as a difference between a transmission signal and a reception signal. In fact, the differential frequency component is produced as an IF (Intermediate Frequency) signal.

FIG. 4 is an exploded perspective view schematically indicating an entire constitution of a transmitting/receiving apparatus of the present invention. As shown in FIG. 4, reference numeral 42 is a driving unite for driving the movable section 31, so as to cause the section 31 to be displaced in a desired manner. Reference numeral 43 is used to represent a horn-like member which is formed with an elongated hole in a direction in which the primary radiator of the movable section 31 is movable. In FIG. 4, "0 dB coupler" and the movable section 31 together form a directional coupler. "RF" is a circuit including the above mixer, "VCO" is a circuit including the above oscillator. Further, "control circuit" is provided to control the movable section driving unit 42 and to obtain distance data (away from a detected object), angle data and relative speed data, which data are in fact extracted from the above intermediate wave signals and are then fed to the outside apparatus. When the above elements are assembled together, all of them are disposed within a case 41, a horn-like member 43 is then attached on to the case 41, a dielectric lens 18 is then mounted on the horn-like member 43 with an O-ring member 44 disposed therebetween. Further, four nuts are arranged on the four corners of the dielectric lens 18, thereby allowing four screws to insert upwardly from below the case 41 so as to fix the dielectric lens 18 on the case 41.

Figure 5:
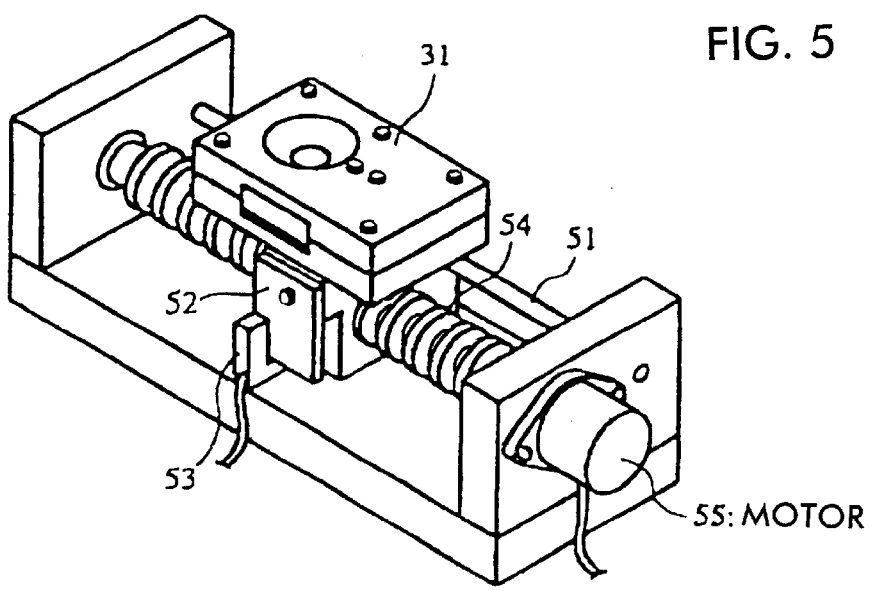
FIG. 5 is a perspective view schematically indicating an example showing the constitution of a movable section driving unit employing a manner using a sending screw.

FIG. 5 is a perspective view schematically indicating the structure of the movable section driving unit. As shown in FIG. 5, a reference numeral 54 is used to represent a sending screw, one end of which is attached through a bearing on a frame structure in a manner such that said sending screw is freely rotatable. The other end of the sending screw 54 is connected to the driving shaft of a pulse motor 55 which is screw-fixed on the same frame structure. Further, a sending guide 51 is installed on the frame structure in a manner such that said sending guide 51 is parallel with the sending screw 54. A nut section screw-engaged with the sending screw 54 is slidably engaged with the sending guide 51. The movable section 31 mounting the primary radiator is screw-fixed on the nut section. Moreover, a light blocking plate 52 is attached on to the upper portion of the above nut section. In addition, a photo-interrupter 53 is provided on the frame structure, in a manner such that its optical axis is passed and covered by the light blocking plate 53.

With the use of the manner in which a sending screw is employed, since the movable section 31 may be displaced towards a predetermined position depending on the number of pulses applied to the pulse motor 55, a basically open loop control is thus formed. Namely, since a CPU capable of effecting a pulse control of the pulse motor can be used to apply a predetermined number of pulses to the pulse motor, it is possible to perform a positional control of the movable section. At the same time, since a present position of the movable section may be counted by a memory and a resister, it is also possible to indirectly detect the position of the movable section. On the other hand, when the pulse motor is under a condition of power swing or in a condition where electric power has just been turned on, it will be difficult to detect an exact position of the movable section. Thus, it is necessary to employ the above light block plate 52 and the above photo-interrupter 53. Namely, with the displacement of the movable section 31, the light blocking plate 52 will arrive at a light blocking position in which it just blocks the optical axis of the photo-interrupter 53, and then the blocking plate 52 will move from the light blocking position to a non-light blocking position. In practice, said light blocking position and said non-light blocking position are all deemed as home positions. If necessary, the CPU will operate to read out a detection signal of the photo-interrupter 53, and when the movable section arrives at the above home positions, a counted value of the above number of pulses is set as a predetermined value (for example, executing a reset).

Nevertheless, when the movable section is caused to move reciprocatingly during a predetermined period to cause a deflection in the beam which is an electromagnetic wave, a timing for the movable section to pass through the above home positions under a normal condition will be coincident with the above period. However, if the movable section deviates away from its predetermined position only because the pulse motor is under an undesired condition such as in a power swing condition, a time interval for detecting the home positions will also deviate away from a predetermined value. For this reason, after a time interval for detecting the home positions or the home positions themselves are detected, a necessary detection is to detect a possible position deviation of the movable section by observing whether the number of pulses produced until the detection of the home positions are equal to a predetermined value. Then, when the position deviation is to be detected, a necessary treatment is to set a count value for the number of the pulses.

When using the manner in which a sending screw is employed, if the nut section and the sending screw 54 are worn away with the passing of time, a phenomenon of backlash will occur. Nevertheless, by detecting the home positions of the photo-interrupter 53 and the light blocking plate 52, it is possible to calibrate a count value indicating the position of the movable section. Therefore, it is sure to determine an absolute position of the movable section, always with a precision which is within a range of ±1 pulse.

Figure 6A:
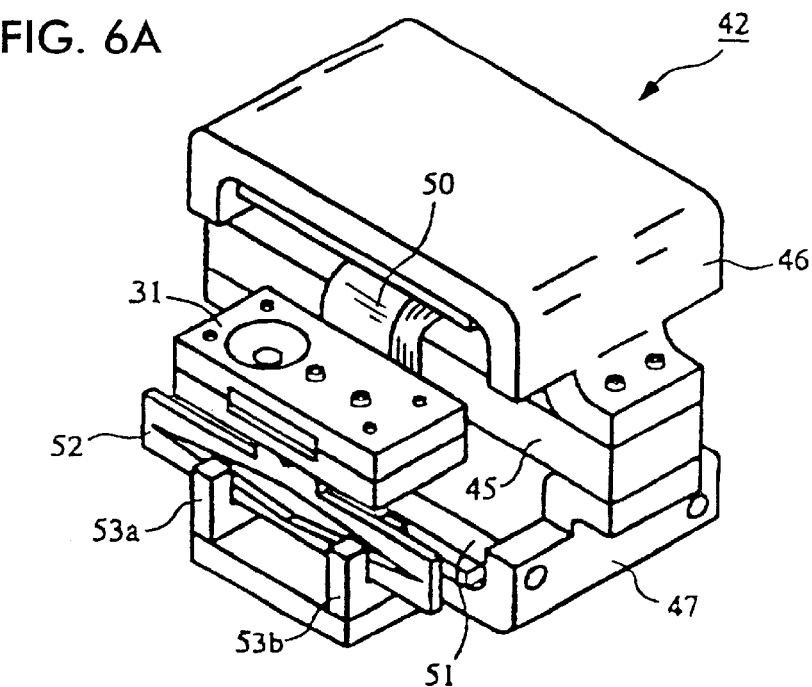
FIG. 6 schematically indicates an example showing the constitution of a movable section driving unit employing a manner using a voice coil motor.
Figure 6B:
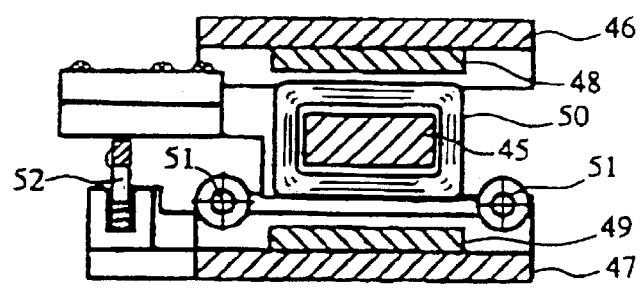

In the example as described in the above, although a motor of rotational movement is used to effect a displacement of the movable section, it is in fact also possible to use a motor of linear movement to effect such a displacement of the movable section. FIG. 6 provides several views schematically indicating the structure of a movable section driving unit under this condition. In detail, FIG. 6A is a perspective view of the driving unit, FIG. 6B is a cross sectional view taken along a plane perpendicular to the displacing direction of the movable section. As shown in the drawings, reference numerals 46 and 47 are used to represent two outer yoke members, while reference numeral 45 is used to represent an inner yoke member. On the inner sides of the two outer yoke members 46 and 47 there are provided two magnets 48 and 49 so as to form a predetermined magnetic circuit. Tow guide pins 51, 51, which are arranged in parallel with the inner yoke member 45, are fixed on the inner side of the outer yoke member 47. Reference numeral 50 is a movable coil which is integrally formed with a movable bush slidably movable along two guide pins 51, 51. At the same time, the inner yoke member 45 is arranged to extend through the entire movable coil 50, in a manner such that said yoke member 45 is separated by a predetermined interval from the inner surface of the movable coil 50. On the other hand, the movable section 31 containing the primary radiator 13 is screw-fixed on the movable bush. In particular, the light blocking plate 52 is attached on the movable bush, forming a rhombic window thereon. Further, two groups of photo-interrupters 53a and 53b are attached on the outer yoke member 47, with the optical axes thereof passing through the rhombic window.

Figure 7:
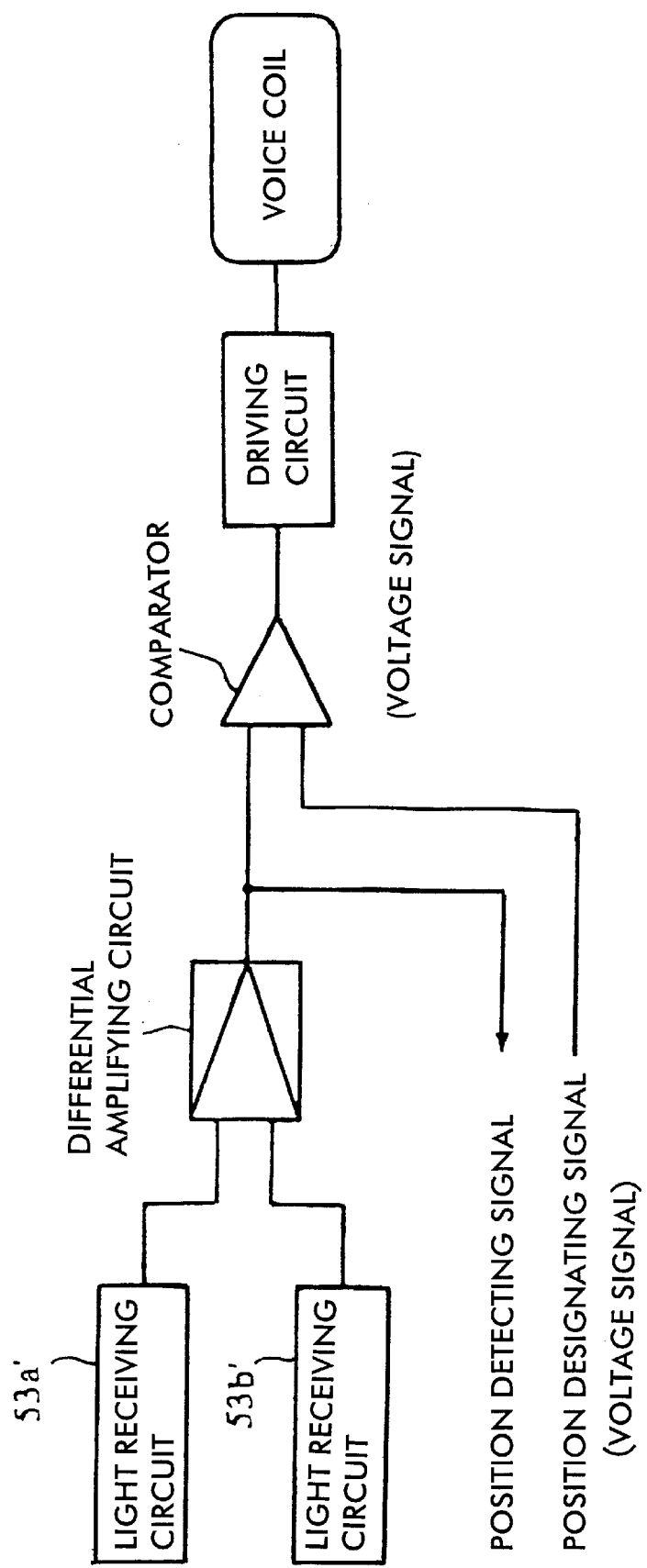
FIG. 7 indicates the constitution of a motor control circuit for controlling the voice coil motor.

FIG. 7 is used to indicate a control circuit for controlling a voice coil motor. Here, reference numerals 53a' and 53b' are used to represent light receiving elements serving as light emitting circuits for use with the photo-interrupters 53a and 53b. A differential amplifying circuit is provided to differentially amplify the output voltages outputted from the light receiving circuits 53a' and 53b'. A comparator is used to perform a comparison between the voltage signal from the differential amplifying circuit and a position designating signal fed from a controller which will be described in detail later. A driving circuit is provided to supply a driving current having a positive polarity or a negative polarity to a voice coil, in accordance with an output voltage from the comparator. With a driving current flowing through the voice coil, the movable section will be displaced. As a result, there will be a feedback passing through a path including successively the light receiving circuit, the differential amplifying circuit, the comparator, the driving circuit and the voice coil, permitting a stabilized condition to be obtained when at last an output voltage from the comparator becomes 0. At this time, a position detecting signal, which is an output voltage from the differential amplifying circuit, will become equal to the position designating signal. Therefore, by providing a predetermined position designating signal, the movable section will be displaced to a position corresponding to the level of the signal. In this way, with the use of thus formed closed loop, it is possible to control the position of the movable section. On the other hand, in order to optimize a responsibility of the above feedback loop, it is also possible to provide a so called loop filter between the above comparator and the above driving circuit.

The two light receiving circuits 53a', 53b' and the differential amplifying circuit shown in FIG. 7 are corresponding to "detecting means for detecting the position of the movable section" in the present invention.

Figure 6C:
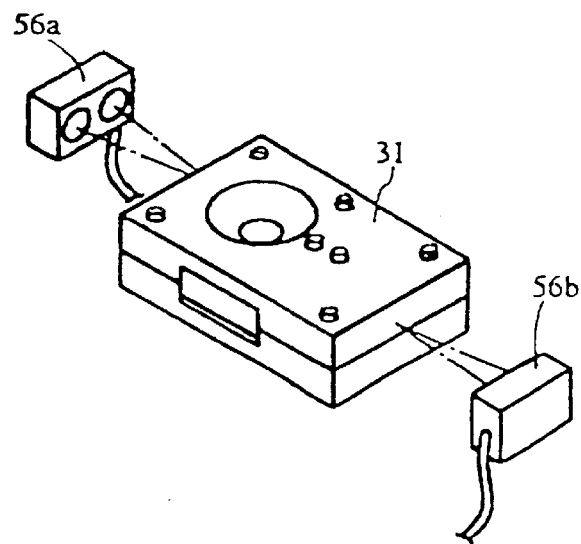

In the above example, although the two photo-interrupters were used as means for directly detecting the position of the movable section, it is also possible to use some reflective type photo-sensors other than the photo-interrupters, such as those shown in FIG. 6C. In FIG. 6C, reference numerals 56a and 56b are used to represent reflective type photo-sensors each consisting of a LED (Light Emitting Diode) and a photo-transistor, which are arranged to face the opposite side faces of the movable section 31 and are fixed in predetermined positions. These photo-sensors 56a and 56b are used to detect the amounts of reflected lights reflected from both side faces of the movable section 31. In this way, when the movable section 31 is displaced, distances between the photo-sensors 56a, 56b and the movable section 31 will also change, thus the amounts of reflected lights on both sides of the movable section 31 will also change corresponding to some changes in said distances. Therefore, by differentially amplifying the output levels of the photo-transistors of the photo-sensors 56a and 56b, it is possible to obtain a signal whose level will change with a change in the position of the movable section, in the same manner as discussed in the above.

On the other hand, as described earlier in the present specification, two photo-interrupters or two reflective type photo-sensors may be provided in a manner such that the detection level will change in an opposite direction corresponding to a displacement of the movable section, and a differential output obtained from every two elements may be used to detect a present position of the movable section. Therefore, even if there is a change in the ambient temperature or there is a change in the photo-interrupters or the reflective type photo-sensors due to the passing of time, influences caused by these changes will be eliminated by one another, thereby always ensuring a high precision in the detecting of the position of the movable section.

Further, in a method of using a voice coil motor as described above, since the positional information of the movable section is obtained in the form of an analogue signal, it is possible to perform deflection control of the beam with the use of a decomposing energy in view of a necessity.

Figure 8:
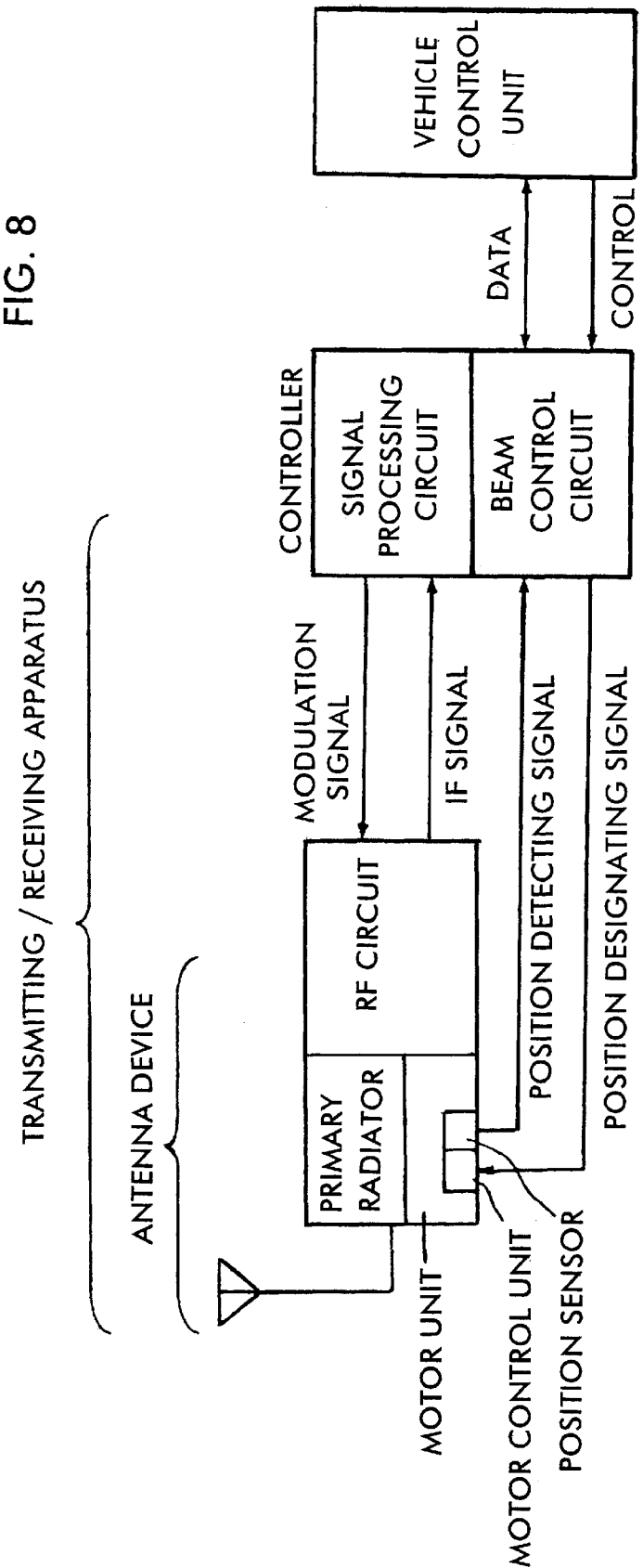
FIG. 8 is a block diagram indicating the constitution of an entire system of the transmitting/receiving apparatus.

FIG. 8 is a block diagram indicating the entire constitution of a transmitting/receiving apparatus. In the drawing, "motor unit" is used to represent the above-mentioned voice coil motor, "position sensor" is used to represent the circuit consisting of the light receiving circuit and the differential amplifying circuit shown in FIG. 7. Further, "RF circuit" is used to represent a high frequency circuit consisting of an NRD guide, the circulator, the oscillator and the mixer provided on one side of the directional coupler, also including another directional coupler. "Signal processing circuit" is provided to supply a modulation signal to the oscillator of the above RF circuit, so as to perform signal processing such as FFT processing on the IF signal produced from the mixer. "Beam control circuit" is provided to supply a position designating signal to a motor control circuit. This "motor control circuit" is provided so as to be corresponding to the comparator and the driving circuit shown in FIG. 7. Moreover, the beam control circuit is used to input and output a detected position signal from the position sensor, so as to detect a present position of the movable section. In addition, the beam control circuit is adapted to receive various kinds of commands from a vehicle control unit, and to produce detection results or the like to the vehicle control unit.

Figure 9:
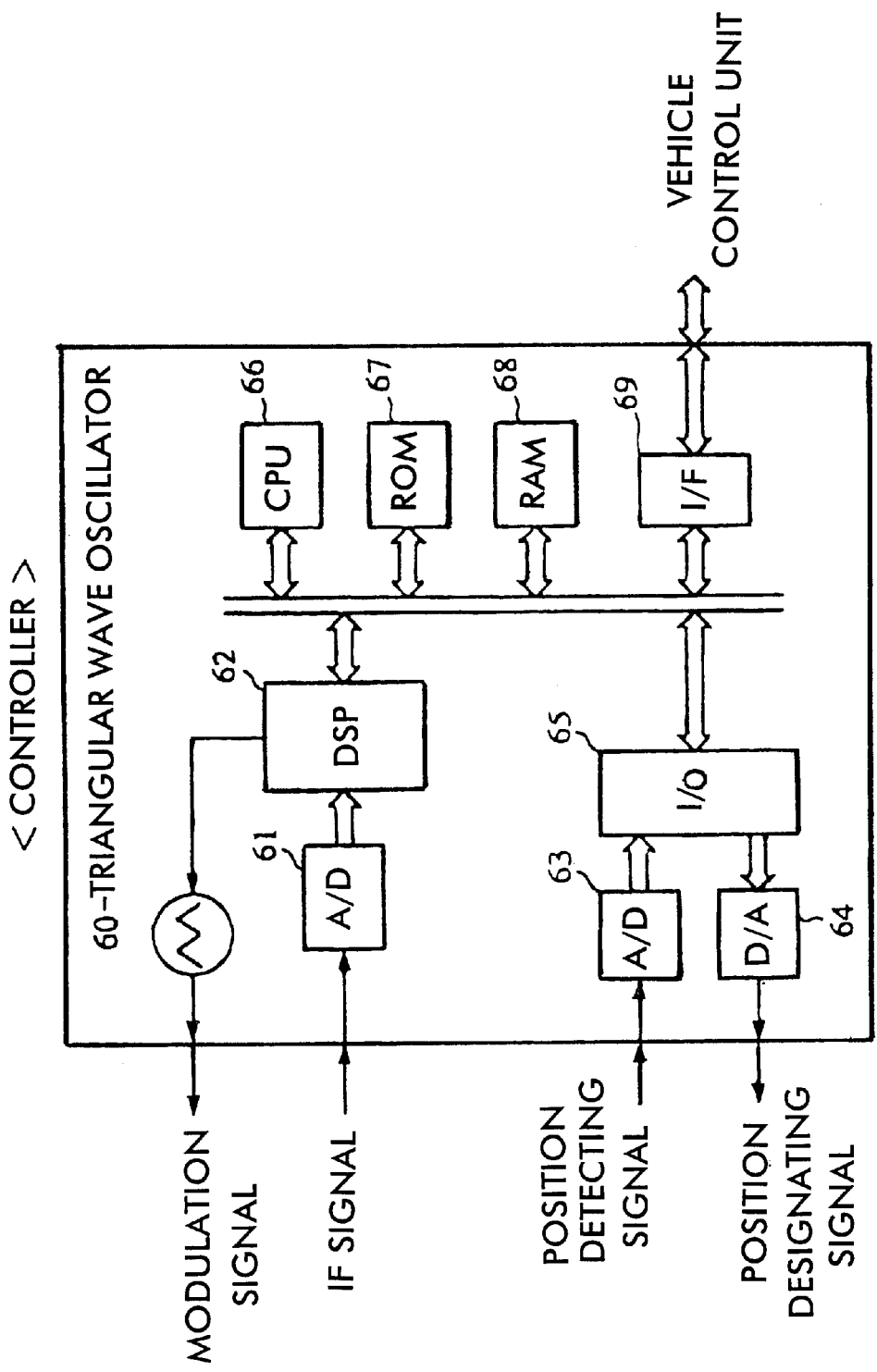
FIG. 9 is a block diagram indicating the constitution of a controller section shown in FIG. 8.

FIG. 9 is a block diagram indicating the constitution of the controller section shown in FIG. 8. In FIG. 9, a triangular wave oscillating circuit 60 is provided to generate a triangular wave having a predetermined frequency, which triangular wave is used as a modulation signal to be supplied to the RF circuit shown in FIG. 8. An A/D converter 61 is provided to convert an IF signal from the RF circuit shown in FIG. 8 into digital data. DSP (Digital Signal Processor) 62 is provided to perform a timing control on the triangular wave oscillating circuit 60, while at the same time to perform an FFT (high speed Fourier conversion) processing on the digital data converted by the A/D converter, thereby extracting desired data necessary for distance measurement and relative speed calculation in an FM-CW manner. CPU 66 is provided to execute a program which has been written in advance in a ROM 67. RAM 68 is provided to be used as a working area during a time period when the program is being executed. A/D converter 63 is provided to convert into a kind of digital signal a detected position signal which is a voltage signal produced from the antenna device corresponding to a position of the movable section. Further, CPU 66 is also adapted to read out the data by way of I/O port 65. Moreover, the CPU 66 is adapted to produce a position designating data of the movable section by way of I/O port 65. D/A converter 64 is provided to supply a position designating signal corresponding to this to the motor control circuit of the antenna device. In addition, the CPU 66 is also adapted to perform data transmission between itself and the vehicle control unit by way of an interface 69.

Figure 10:
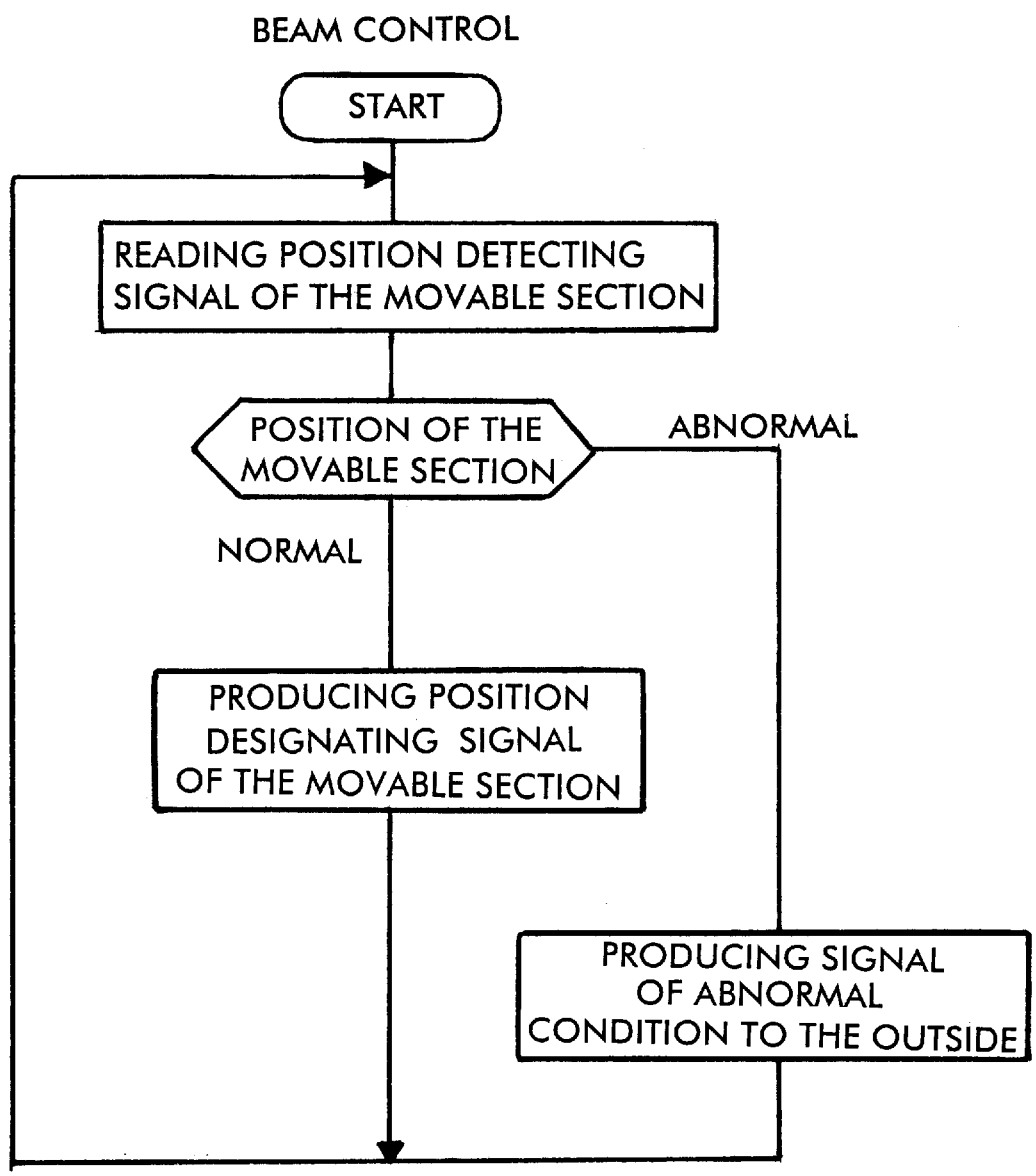
FIG. 10 is a flow chart indicating a beam control of the controller.

FIG. 10 is a flow chart indicating a processing procedure for the CPU to perform a beam control. At first, a position detecting signal of the movable section is read out. Namely, the data converted in the A/V converter 63 shown in FIG. 63 is read out. Subsequently, it is determined whether a present position of the movable section is in a normal position, with the use of a predetermined reference. If it is determined that the movable section is in a normal position, a position detecting signal is produced. In other words, data for designating a position for the movable section to arrive at is supplied to the D/A converter 64.

Even if the responsibility of motor unit is considered, when the movable section is deemed to have been not tracing in a normal manner, such kind of abnormal condition can be transmitted to an outside section such as a vehicle control unit.

Figure 11:
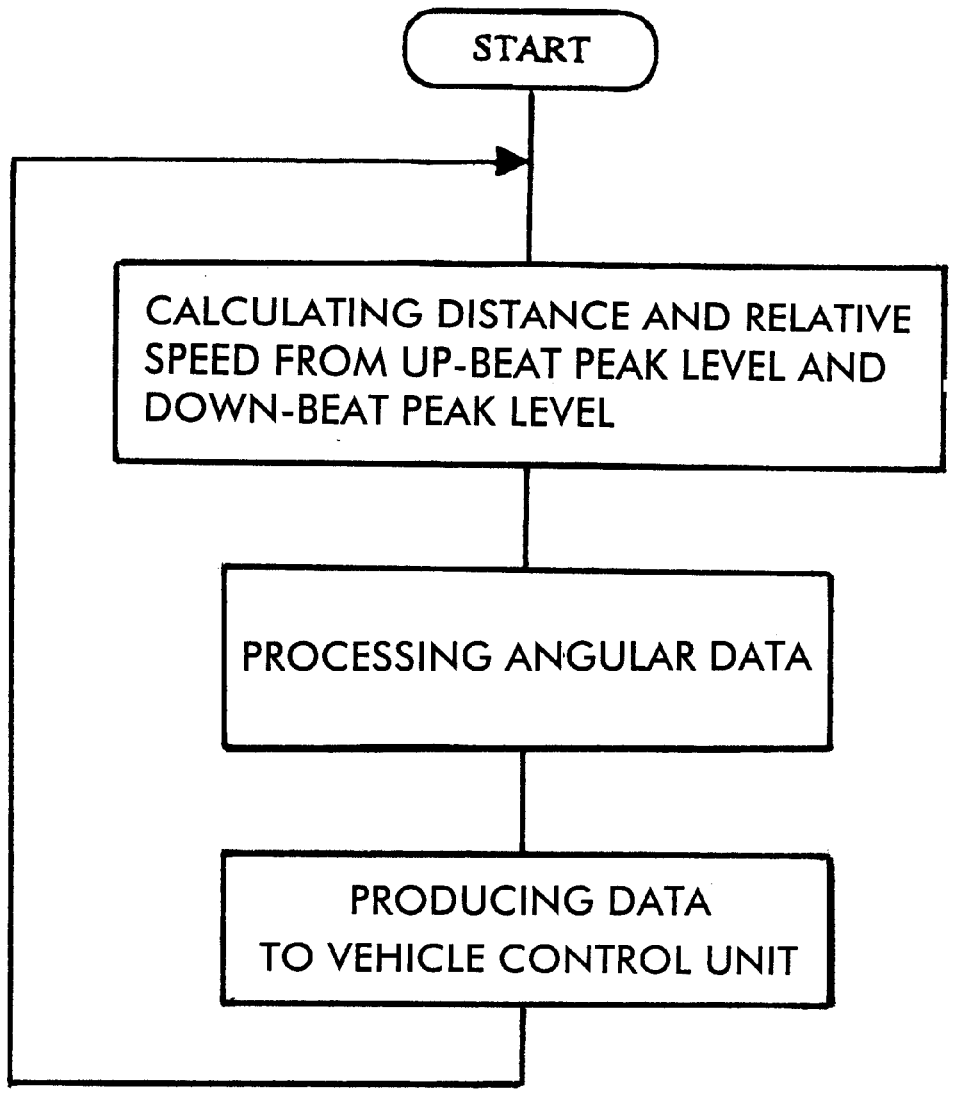
FIG. 11 is a flow chart indicating a transmitting/receiving control of the controller.

FIG. 11 is a flow chart indicating a control procedure performed by the above CPU to control transmission and reception. At first, peak level of up-beat (which is one of two beat components when carrier frequency of a transmission signal is higher than that of the other, said two beat components are generated due to a frequency difference between a transmitted signal which has been frequency modulated into a triangular wave and a received signal reflected from a detected object) and peak level of down-beat (which is one of the above two beat components when carrier frequency of a transmission signal is lower than that of the other) obtained through the DSP 62 are used to calculate a distance from an object and a relative speed. On the other hand, the direction of a beam decided by a position of the movable section of the antenna device is used as an angular information of the detected object so as to be fed to the vehicle control unit. By repeating such kind of process with a predetermined period, it is possible to successively transmit the detected information (various information such as a relative speed, a distance and an angle) to the vehicle control unit.

Next, several examples for controlling the deflection of the beam will be described with reference to FIGS. 12–15.

Figure 12A:
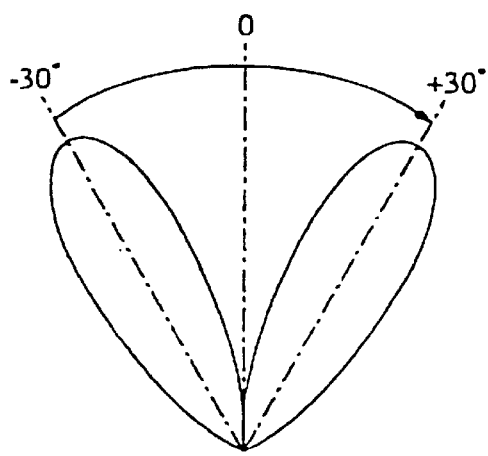
FIG. 12 indicates an example of a scanning pattern within a detecting range.
Figure 12B:
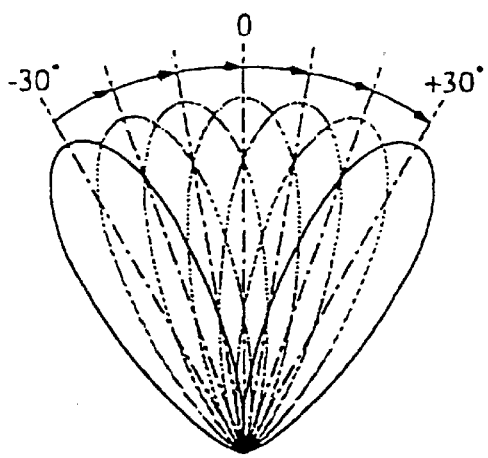
Figure 12C:
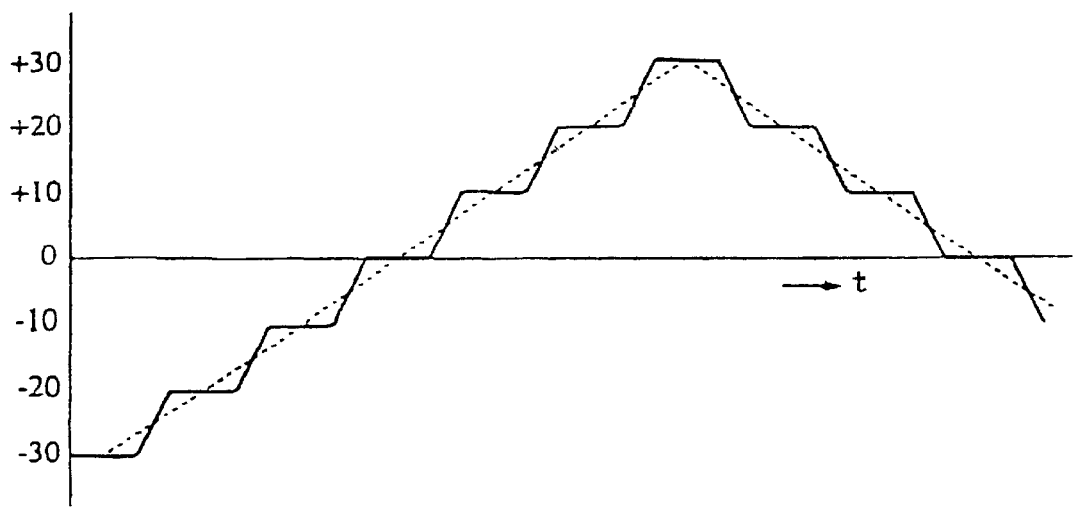

In an example shown in FIG. 12, if a situation ahead of the vehicle is to be detected, a detecting arrange is ±30° C. with a straight ahead direction being 0° C. (hereinafter, such kind of angular is referred to as "tilt angle"). At this time, within a range from –30° C. to +30° C. as shown in FIG. 12A, a direction for the beam to scan with a predetermined velocity and the tilt angle is detected. Further, as shown in FIG. 12B, the direction of the beam is gradually changed step by step, and said angle is detected in each direction at each step. FIG. 12C is a graph that is used to indicate a change of the beam in which the horizontal axis represents time t and the vertical axis represents a tilt angle of the beam, whilst a broken line is used to represent the record of the scanning in the former manner and the solid line is used to represent the record of the scanning in the later manner.

Figure 13A:
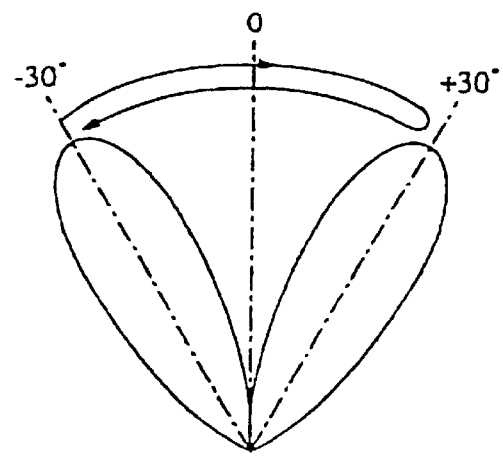
FIG. 13 indicates an example of a scanning pattern within a detecting range.
Figure 13B:
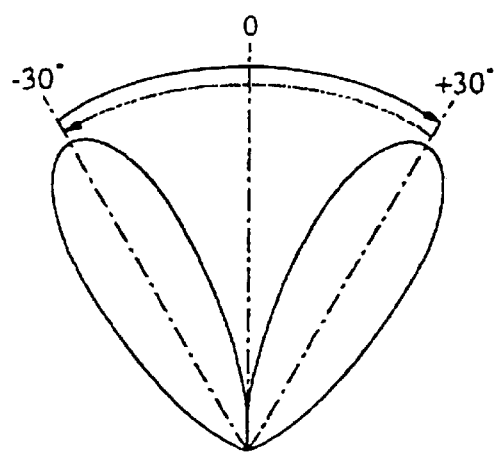
Figure 13C:
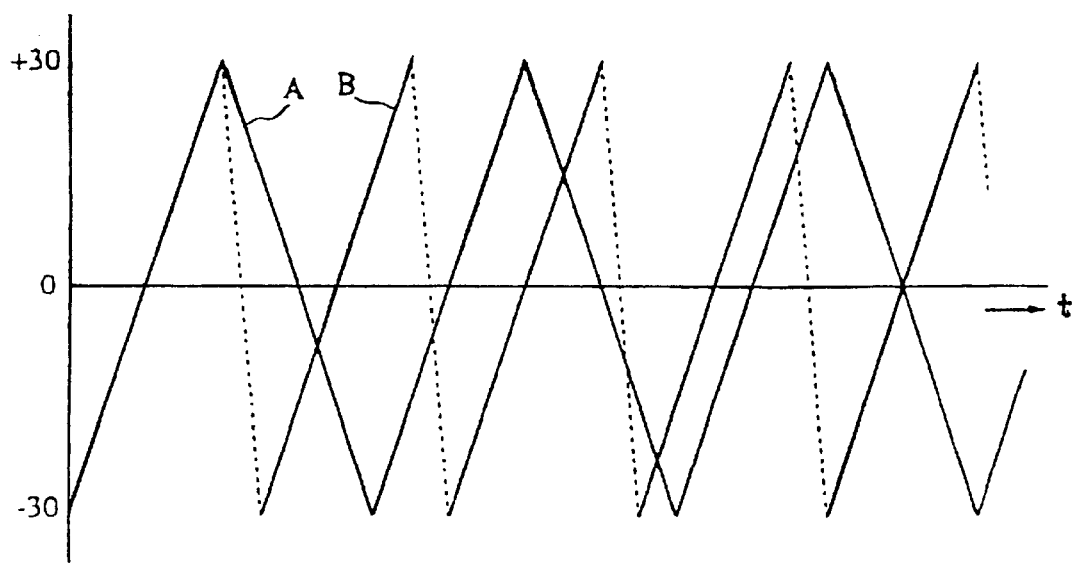

When the above detection is to be conducted within a predetermined range of angle, it is possible to use a method as shown in FIG. 13A which requires that at first, a scanning is performed from –30° C. to +30° C. when said detection is conducted, afterwards the scanning is performed from +30° C. to –30° C. when the said detection is conducted. Further, it is also possible to use a method as shown in FIG. 13B which requires that only a scanning from –30° C. to +30° C. is performed (one way journey) when said detection is conducted, but a returning from +30° C. to –30° C. is carried out at a high speed without conducting said detection. FIG. 13C is a graph which is used to indicate a change of the beam under conditions of both 13A and 13B. In FIG. 13C, A is used to represent a scanning in the former manner while B is used to represent a scanning in the latter manner.

In the examples discussed above, although it has been indicated that a scanning is carried out uniformly and equivalently everywhere within a range to be scanned, it is also possible that such kind of scanning may be carried out continuously from one predetermined small range to another, with all predetermined small ranges being included in an entire scanning range. For instance, it is possible to use a manner as shown in FIG. 14A which requires the provision of two periods for scanning, with one period of scanning being in a range from –20° C. to 0° C. and another period of scanning being in a range from 0° C. to +20° C. FIG. 14B is a graph which is used to indicate a change of the beam under a condition of FIG. 14A. Similarly, it is also possible to provide a scanning period of a range from –20° C. to 0° C., a scanning period of a range from –10° C. to 10° C., a scanning period of a range from 0° C. to 20° C.

Figure 15A:
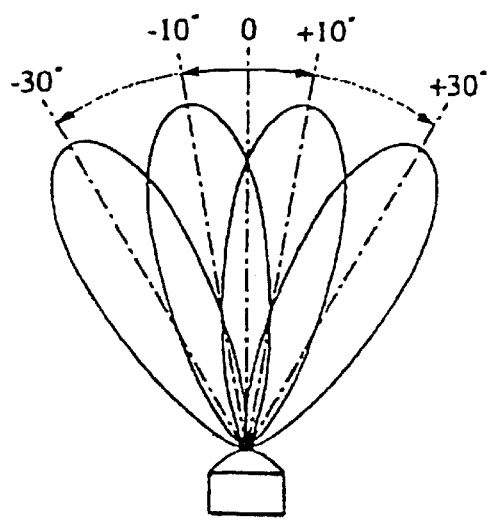
FIG. 15 indicates an example of a scanning pattern within a detecting range.
Figure 15B:
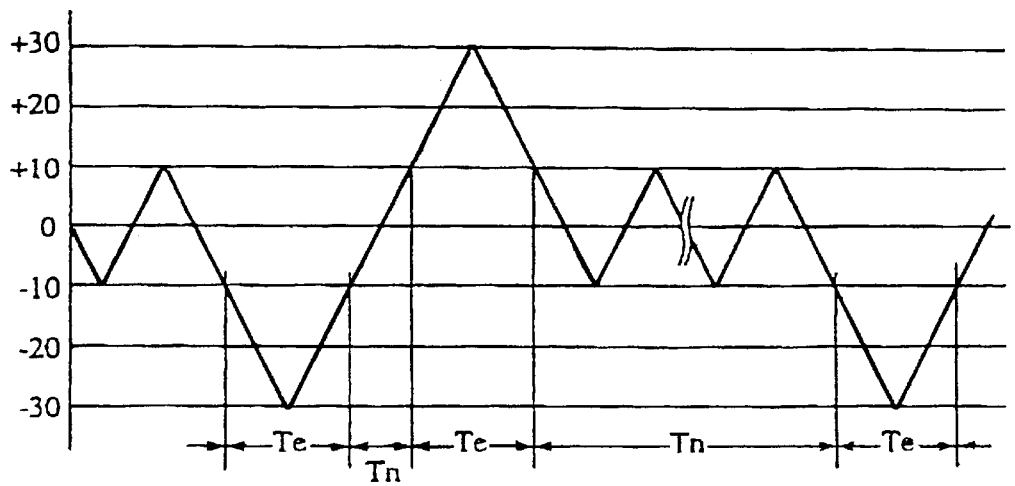

FIG. 15 is used to indicate a condition which allows a frequency and a speed of the scanning to be changed corresponding to a range to be detected. In an example shown in FIG. 15A, a frequency of scanning within a range of ±10° C. is made relatively higher, whilst a frequency of scanning in a range from –30° C. to –10° C. and a frequency of scanning in a range from +10° C. to +30° C. are made relatively low. In an example as shown in FIG. 15B, during time periods Te, a scanning in a range from –30° C. to –10° C. or a scanning in a range from +10° C. to +30° C. is conducted. During other time periods Tn, a scanning in a range of ±10° C. is carried out.

Figure 15C:
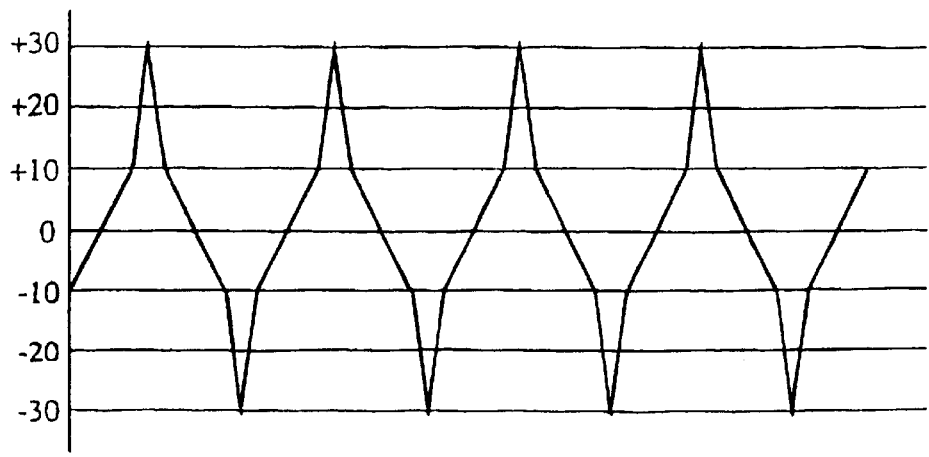

Further, as shown in FIG. 15C, it is also possible that a scanning speed may be made higher in a range where a scanning frequency is low. With the use of this manner, for those ranges of higher importance it is possible to increase a decomposing energy in both an angular direction and a distance direction so as to carry out said detection, thereby making it possible to perform the desired detection with a larger angular range, without any necessity of increasing a time which is one period necessary for conducting a scanning in an entire scanning range.

Next, an explanation will be given to a method of setting a standard position for the movable section, and to the constitution of a transmitting/receiving apparatus having a setting function, with reference to FIGS. 16 and 17.

As shown in FIGS. 5–7, if there is provided a means capable of detecting the position of the movable section and then causing the movable section to be displaced, it is possible to enable the movable section to be displaced to any optional position. However, it is also possible that if required by a precision of the sizes of various elements forming the apparatus or required by a precision when assembling together these elements, the orientation of an actual beam may be in a manner other than that described in the above. For instance, as shown in FIG. 6, it is necessary to take into account various factors which might cause some errors, such factors include an installing position of the light blocking plate 52 with respect to the movable section, a deviation in the position of the rhombic window formed on the light blocking plate 52, an installing precision of the photo-interrupters 53a, 53b with respect to the fixed section, an installing precision of the primary radiator with respect to the movable section, an installing precision of the voice coil motor with respect to the case, a size precision of the dielectric lens. For this reason, there will be a deviation in an orientation (tilt angle) of an actual beam, with respect to a position designating signal to be fed to the antenna device.

For the reasons discussed above, as shown in FIG. 16, it is necessary to arrange a measurement receiving device in a position which is just ahead (on the front side) of the transmitting/receiving apparatus, i.e., a position where the tilt angle is zero, thereby eliminating the above-mentioned possible deviations corresponding to a signal receiving intensity of the measurement receiving device. Namely, the signal receiving intensity of the measurement receiving device is detected with the use of a standard position setting device, and data for changing the position of the movable section of the antenna device is supplied to the transmitting/receiving apparatus. When the signal receiving intensity becomes maximum, a command for setting a standard position is supplied to the transmitting/receiving apparatus. In this way, the position of the movable section of the antenna device may be set as a standard or reference position, under a condition where an actual beam is overlapped on a straight line connected between the center of the transmitting/receiving apparatus and the measurement receiving device.

Figure 16:
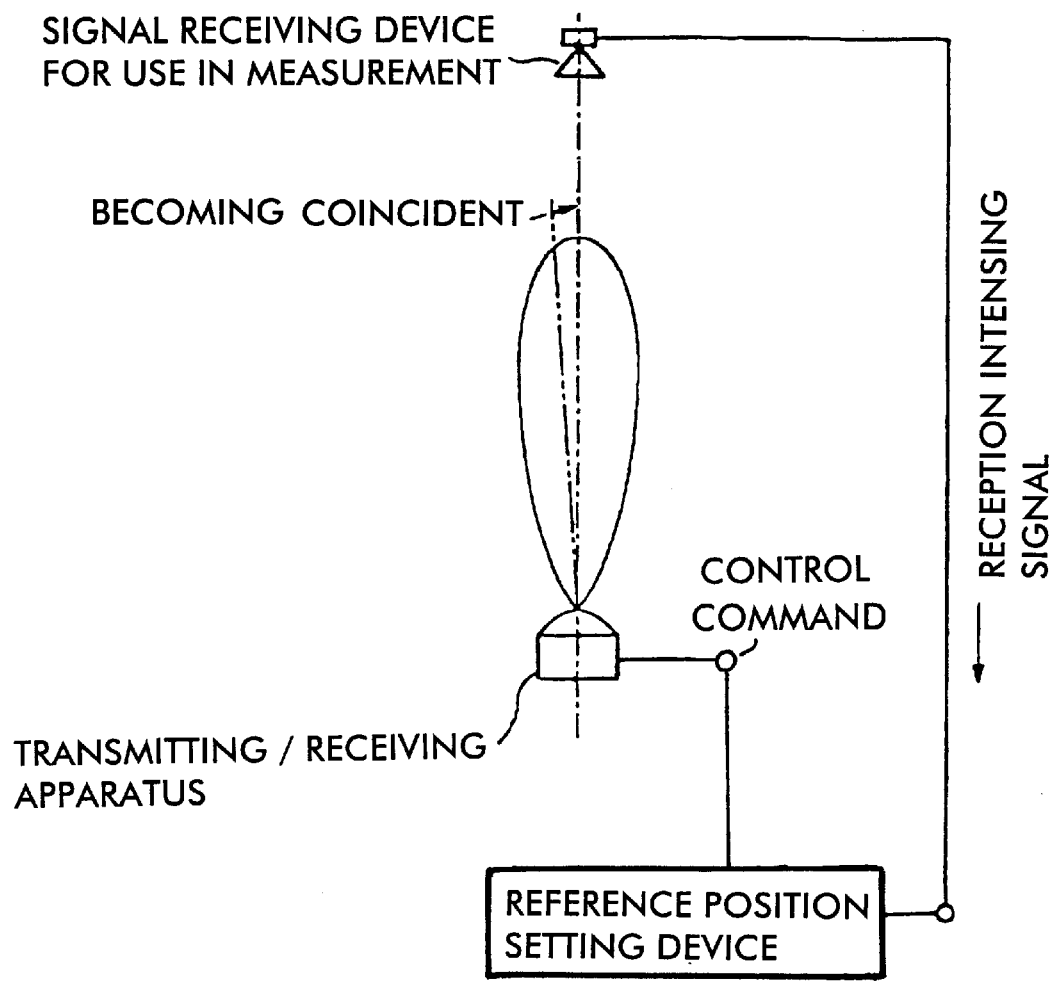
FIG. 16 indicates an operation for setting a standard position of the movable section.
Figure 17:
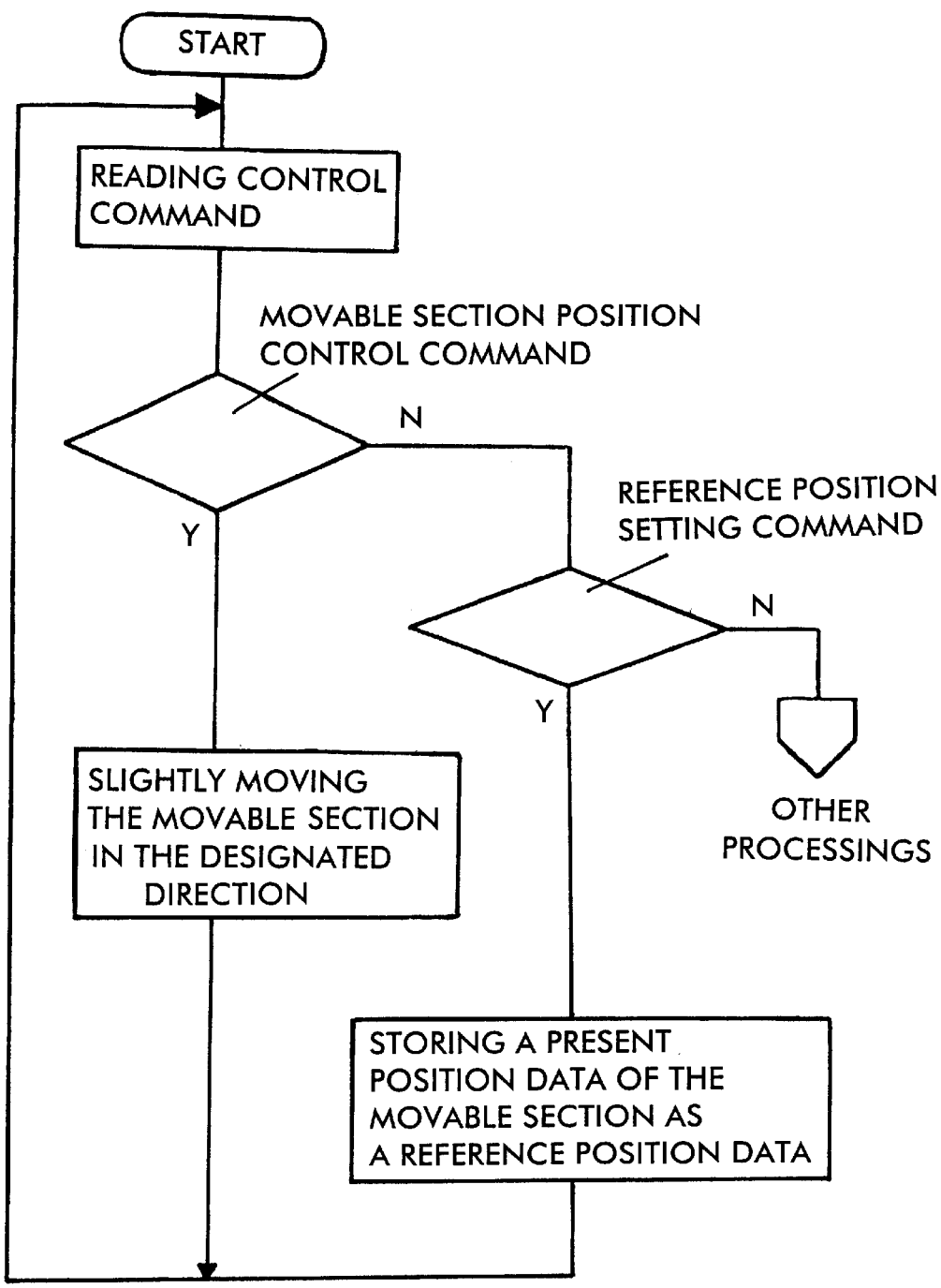
FIG. 17 is a flow chart indicating a procedure for the controller of the transmitting/receiving apparatus to set the standard position.

FIG. 17 is a flow chart indicating a processing procedure for use in the transmitting/receiving apparatus of the present invention when using a standard position setting device shown in FIG. 16 for effecting a desired setting. A human operator conducting an adjustment by using the standard position setting device is able to give a command for moving the movable section in a positive direction or a negative direction with respect to the transmitting/receiving apparatus, thereby moving the position of the movable section step by step successively and at the same time detecting a point where a signal receiving intensity is maximum with the use of the measurement receiving device. At this moment, a command for setting the standard position is fed to the transmitting/receiving apparatus. In detail, these control commands are read out from the standard position setting device. If the command which has been read out is that capable of moving the movable section in the positive direction or the negative direction, the movable section may be moved slightly in a designated direction. Upon receiving the command for setting the standard position, data representing a present position of the movable section (which is data converted by the A/D converter 63 shown in FIG. 9) is stored as data representing a standard position of the movable section.

After that, when only the transmitting/receiving apparatus operates to cause the movable section to be displaced to any optional position (at a step shown in FIG. 10 for producing a signal for designating a position of the movable section), a correction is conducted by adding together the above standard position data and the above position designating data, thereby supplying the position designating data after correction to the D/A converter 64 shown in FIG. 9. In this way, it is sure to correct a deviation which is possibly caused due to errors in the size precision of various elements and an error in the precision when assembling these elements together.

Nevertheless, although the above examples are related to the use of a voice coil motor, it is also possible to use a pulse motor to cause the movable section to be displaced, as in a manner using the above sending screw, thereby obtaining similar effects. Further, pulse control is required to be performed such that the movable section may be displaced to a position corresponding to a value obtained by adding together the standard position data the above position designating data.

Figure 18A:
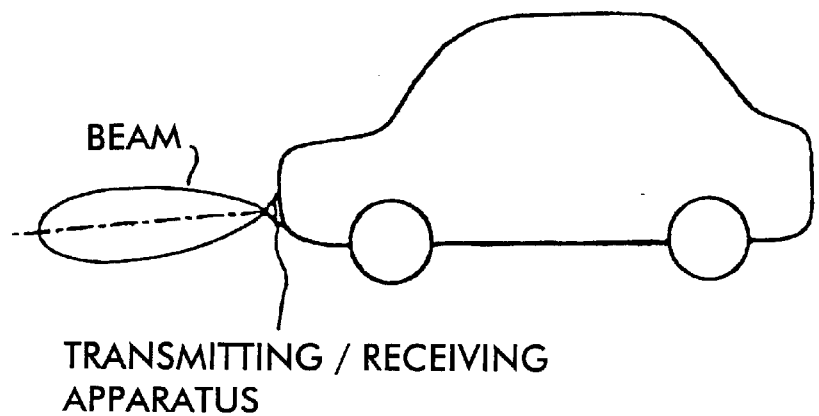
FIG. 18 indicates an operation for setting a standard position of the movable section.
Figure 18B:
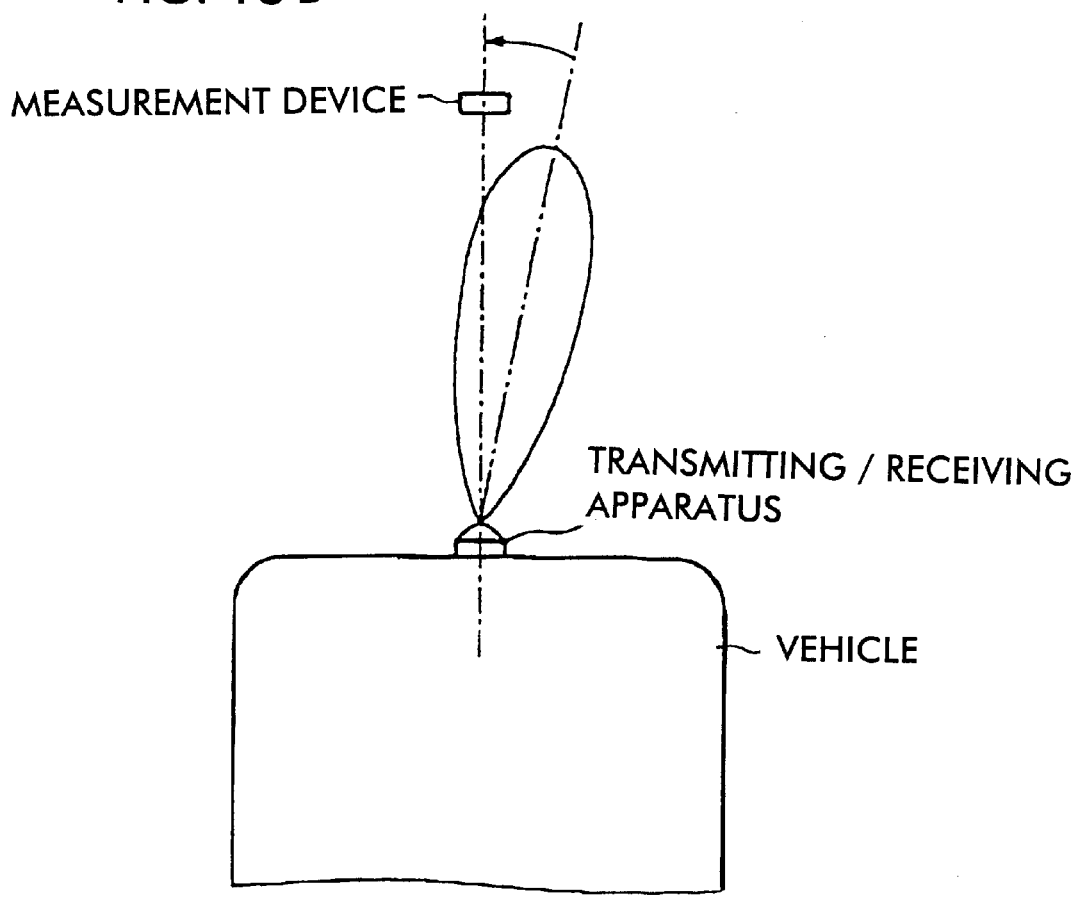

Although the setting of the standard position described above is related to an adjustment by using only transmitting/receiving apparatus, under a condition where the transmitting/receiving apparatus has been mounted on a vehicle, position deviations will also occur due to a condition of size precision on an installing portion for installing the apparatus on to a vehicle, also corresponding to an installing precision when installing the apparatus on to the vehicle. In order to carry out desired correction under the above-described condition, it is required that a measurement device be disposed in a standard position shown in FIG. 18 which is just ahead of the vehicle on the front side thereof, and that the measurement device be used to measure a signal receiving electric power of an electromagnetic wave transmitted from the transmitting/receiving apparatus. Then, the movable section of the antenna device of the transmitting/receiving apparatus is controlled from the outside so as to obtain a maximum signal level, and a position of the movable section at this moment is stored as standard position data. For this reason, the method for setting a standard position can produce similar effects even if the transmitting/receiving apparatus solely is used.

On the other hand, it is also possible that standard position data set in the transmitting/receiving apparatus may be used as such without being processed any more, and that said standard position data may be set separately under a condition where said apparatus has been mounted on a mounting apparatus such as a vehicle. In view of this, if the position designating data prior to correction is assumed to be Ps, the standard position data set in only the transmitting/receiving apparatus is assumed to be P01, the standard position data set after the apparatus has been mounted on a mounting equipment such as a vehicle is assumed to be P02, the position designating data after correction is assumed to be Pa, a position deviation can be corrected by virtue of a relationship Pa=Ps+P01+P02.

According to the present invention, since at least the primary radiator and a first transmission line are provided on the movable section, it is possible to render the movable section compact in size, thereby rendering compact the entire size of said apparatus. Further, by making light the movable section of the apparatus, it is possible to have the beam deflected at a high speed. In addition, since the beam may be deflected in any optional direction by only supplying from outside a position designating signal of the movable section, the beam scanning may be made easy.

Furthermore, the beam may be caused to scan in a predetermined pattern and a radar for conducting a desired transmission and reception of an electromagnetic wave may be constructed with an increased ease.

Moreover, even if a relative relationship between the primary radiator and the dielectric lens is not uniform due to possible errors in the size precision of various elements and an error in assembling these elements, the axis of the beam is allowed to be directed in a predetermined direction without being affected by a fluctuation in said relative relationship.

In addition, even if a relative relationship between the primary radiator and the dielectric lens is not uniform due to a possible error in an installing portion of a mounting equipment such as a vehicle mounting the above antenna device or due to an error in an assembling operation, the axis of the beam is allowed to be directed in a predetermined direction without being affected by a fluctuation in said relative relationship.

What is claimed is:

1. An antenna device having a primary radiator and a first transmission line combined with the primary radiator provided on a movable section, a second transmission line electromagnetically combined with the first transmission line and a dielectric lens with a position of said primary radiator serving as a generally focal point surface provided on a fixed section, said antenna device furlher comprising a driving mechanism capable of causing the movable section to be displaced relatively with respect to the fixed section, and control means capable of driving the driving mechanism and displacing the movable section in accordance with a position designating signal of the movable section.

2. The antenna device as claimed in claim 1, wherein movable section position detecting means for detecting the position of the movable section is provided, the control means is capable of driving the driving mechanism in accordance with a detection result of the movable section position detecting means and the position designating signal of the movable section.

3. A transmitting/receiving apparatus employing an antenna device recited in claim 1 or 2, a predetermined position designating signal being supplied to the control means so as to enable a beam, which is determined by a relative relationship between the dielectric lens and the primary radiator, to scan in a predetermined pattern, and to perform predetermined transmission and reception of an electromagnetic wave.

4. The transmitting/receiving apparatus as claimed in claim 3, wherein means is provided to store a position of the movable section as a standard position when the axis of the beam of said antenna device is directed in a predetermined direction, the control means is capable of determining the position of the movable section with the standard position serving as a reference.

5. The transmitting/receiving apparatus as claimed in claim 3, under a condition where the antenna device has been mounted on a mounting equipment, means is provided for storing the position of the movable section as a standard position when the beam axis is directed in a predetermined direction while being viewed from the mounting equipment, the control means is capable of determining the position of the movable section with the standard position serving as a reference.

6. The transmitting/receiving apparatus as claimed in claim 5, wherein the mounting equipment comprises a vehicle.

* * * * *